(12) United States Patent
Matsuzawa et al.

(10) Patent No.: US 10,674,030 B2
(45) Date of Patent: Jun. 2, 2020

(54) ILLUMINATION DEVICE AND IMAGE READING DEVICE

(71) Applicant: Mitsubishi Electric Corporation, Chiyoda-ku (JP)

(72) Inventors: Taku Matsuzawa, Chiyoda-ku (JP); Toru Shiraki, Chiyoda-ku (JP); Hideki Kunishio, Chiyoda-ku (JP); Daisuke Ohama, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 16/475,445

(22) PCT Filed: Feb. 21, 2018

(86) PCT No.: PCT/JP2018/006129
§ 371 (c)(1),
(2) Date: Jul. 2, 2019

(87) PCT Pub. No.: WO2018/155472
PCT Pub. Date: Aug. 30, 2018

(65) Prior Publication Data
US 2019/0349495 A1    Nov. 14, 2019

(30) Foreign Application Priority Data
Feb. 22, 2017  (JP) ................. 2017-030665

(51) Int. Cl.
*H04N 1/04* (2006.01)
*H04N 1/028* (2006.01)
(Continued)

(52) U.S. Cl.
CPC ............... *H04N 1/028* (2013.01); *H04N 1/04* (2013.01); *G02B 2006/0098* (2013.01); *G03B 27/54* (2013.01)

(58) Field of Classification Search
CPC .. H04N 1/028; H04N 1/04; G02B 2006/0098; G03B 27/54
(Continued)

(56) References Cited

U.S. PATENT DOCUMENTS 6,259,082 B1    7/2001  Fujimoto et al.
7,125,151 B2 *  10/2006  Uemura ............... G02B 5/0221
                                                  362/602
(Continued)

FOREIGN PATENT DOCUMENTS

JP         11-55464 A     2/1999
JP       2004-56425 A     2/2004
(Continued)

OTHER PUBLICATIONS

International Search Report dated Apr. 10, 2018, in PCT/JP2018/006129 filed on Feb. 21, 2018.
(Continued)

*Primary Examiner* — Cheukfan Lee
(74) *Attorney, Agent, or Firm* — Oblon, McClelland, Maier & Neustadt, L.L.P.

(57) ABSTRACT

An illumination device includes a light source and a rod-like light guide extending in a longitudinal direction for guiding incident light to an object to be illuminated. The light source is disposed at an end of the light guide extending in a longitudinal direction. The light guide includes an incident surface at the longitudinal end to receive light emitted from the light source, a flat emission surface to emit light incident on the light guide toward the object to be illuminated, a parabolic reflective surface to reflect, toward the emission surface, light from a focus of the paraboloid shape of the refractive surface or light passing through the focus from a predetermined area, and a light-scattering portion, having a predetermined area, to scatter light entering through the
(Continued)

incident surface and reflect the light toward the reflective surface. The light-scattering portion is placed at the focus of the paraboloid shape or at a position where light reflected by the scattering area on the light-scattering portion passes through the focus.

7 Claims, 17 Drawing Sheets

(51) Int. Cl.
  *G02B 6/00* (2006.01)
  *G03B 27/54* (2006.01)
(58) Field of Classification Search
  USPC .................................... 358/484, 475, 509
  See application file for complete search history.

(56) References Cited

U.S. PATENT DOCUMENTS

| | | | | |
|---|---|---|---|---|
| 2001/0019487 | A1* | 9/2001 | Honguh | G02B 6/0038 362/551 |
| 2001/0035986 | A1* | 11/2001 | Ikeda | H04N 1/031 358/475 |
| 2005/0195618 | A1 | 9/2005 | Uemura et al. | |
| 2006/0098247 | A1 | 5/2006 | Sawada | |
| 2006/0159393 | A1* | 7/2006 | Ikeda | H04N 1/0318 385/31 |
| 2012/0307322 | A1* | 12/2012 | Ozawa | G03G 15/0409 358/475 |
| 2013/0016385 | A1* | 1/2013 | Kim | H04N 1/02815 358/1.13 |
| 2013/0038914 | A1* | 2/2013 | Yoshida | H04N 1/0285 358/474 |
| 2014/0293372 | A1 | 10/2014 | Okamoto et al. | |
| 2015/0136951 | A1* | 5/2015 | Ohama | H04N 1/02835 250/208.1 |
| 2015/0319329 | A1* | 11/2015 | Matsuzawa | H04N 1/0281 358/475 |
| 2016/0014294 | A1* | 1/2016 | Matsuzawa | H04N 1/00167 358/475 |
| 2019/0379801 | A1* | 12/2019 | Matsuzawa | G03B 27/54 |

FOREIGN PATENT DOCUMENTS

| | | |
|---|---|---|
| JP | 2004-266313 A | 9/2004 |
| JP | 2005-117602 A | 4/2005 |
| JP | 2008-198615 A | 8/2008 |
| JP | 2013-55648 A | 3/2013 |
| JP | 2015-231163 A | 12/2015 |
| WO | WO 2013/062009 A | 5/2013 |

OTHER PUBLICATIONS

Japanese Office Action (Notice of Reasons for Refusal) dated Oct. 30, 2018, issued for the corresponding JP Patent Application No. 2018-546912, with English translation, 10 pages.
Japanese Office Action (Decision to Grant) dated Dec. 20, 2018, issued for the corresponding JP Patent Application No. 2018-546912, with English translation, 5 pages.

* cited by examiner

ILLUMINATION DEVICE AND IMAGE READING DEVICE

TECHNICAL FIELD

The present disclosure relates to an illumination device used in an image reading device such as, particularly, a facsimile, a copier, or a scanner, and to an image reading device.

BACKGROUND ART

An image reading device illuminates an object having an uneven surface with light having a great depth of illumination to clearly scan the object.

Patent Literature 1 describes an image reading device in which light is emitted from a light source array with an optical axis of the light source array extending toward a manuscript, light emitted from the light source is made to enter a light guide and then is reflected on the reflective surface of the light guide toward the manuscript so that the manuscript is illuminated. Patent Literature 1 describes that the reflective surface includes multiple continuous flat surfaces.

Patent Literature 2 describes an illumination device in which one end of a flat surface as a light beam incident surface crosses one end of a flat surface as a light beam emission surface at substantially right angles and the other end of the flat surface as a light beam incident surface is connected to the other end of the flat surface as a light beam incident surface by an elliptic curve serving as a concave reflector.

Patent Literature 3 describes an illumination unit in which light-emitting diode (LED) chips emit light toward a cylindrical parabolic mirror, and the light enters a cylindrical parabolic block through the incident surface of the cylindrical parabolic block. The light is internally reflected by the cylindrical parabolic mirror, and the reflected light is emitted as a substantially collimated light beam, from the prismatic emission surface of the cylindrical parabolic block onto an area to be illuminated.

CITATION LIST

Patent Literature

Patent Literature 1: Unexamined Japanese Patent Application Kokai Publication No. 2013-55648 (FIG. 4)
Patent Literature 2: Unexamined Japanese Patent Application Kokai Publication No. 2005-117602 (FIG. 29)
Patent Literature 3: International Publication No. WO 2013/062009 (FIGS. 12 and 13)

SUMMARY OF INVENTION

Technical Problem

In the technique of Patent Literature 1, the reflective surface is a flat surface formed on the side surface extending in the main scanning direction (longitudinal direction) of the light guide. The flat reflective surface may cause light emitted from the light guide to diverge, thus lowering the illumination efficiency.

In the technique of Patent Literature 2, the concave reflector has an elliptic curve, which may cause light emitted from the light beam emission surface to diverge, thus failing to achieve a great depth of illumination and lowering the illumination efficiency.

With the technique in Patent Literature 3, the emission surface of the cylindrical parabolic block is prismatic, and may cause light emitted from the prism interface to be reflected diffusely, thus degrading the illumination efficiency.

In consideration of the aforementioned circumstances, an objective of the present disclosure is to provide an illumination device that efficiently illuminates a manuscript with light from a light source having a great depth of illumination, and an image reading device including the illumination device.

Solution to Problem

An illumination device or an image reading device according to the present disclosure includes a light source, and a rod-like light guide extending in a longitudinal direction to guide incident light toward an object to be illuminated. The light source is placed at an end of the light guide in the longitudinal direction. The light guide includes an incident surface at the end in the longitudinal direction to receive light emitted from the light source, a flat emission surface to emit light incident on the light guide toward the object to be illuminated, a reflective surface with a paraboloid shape to reflect, toward the emission surface, light from a focus of the paraboloid shape or light traveling from a predetermined area and passing through the focus, and a light-scattering portion, having a predetermined scattering area, to scatter incident light through the incident surface and reflect the light toward the reflective surface. The light-scattering portion is placed at the focus for the paraboloid shape or at a position at which light reflected by the scattering area on the light-scattering portion passes through the focus for the paraboloid shape.

Advantageous Effects of Invention

According to the present disclosure, an illumination device and an image reading device including the illumination device can be obtained that can efficiently illuminate a manuscript with light from a light source having a great depth of illumination.

DESCRIPTION OF EMBODIMENTS

Embodiment 1

Figure 1:
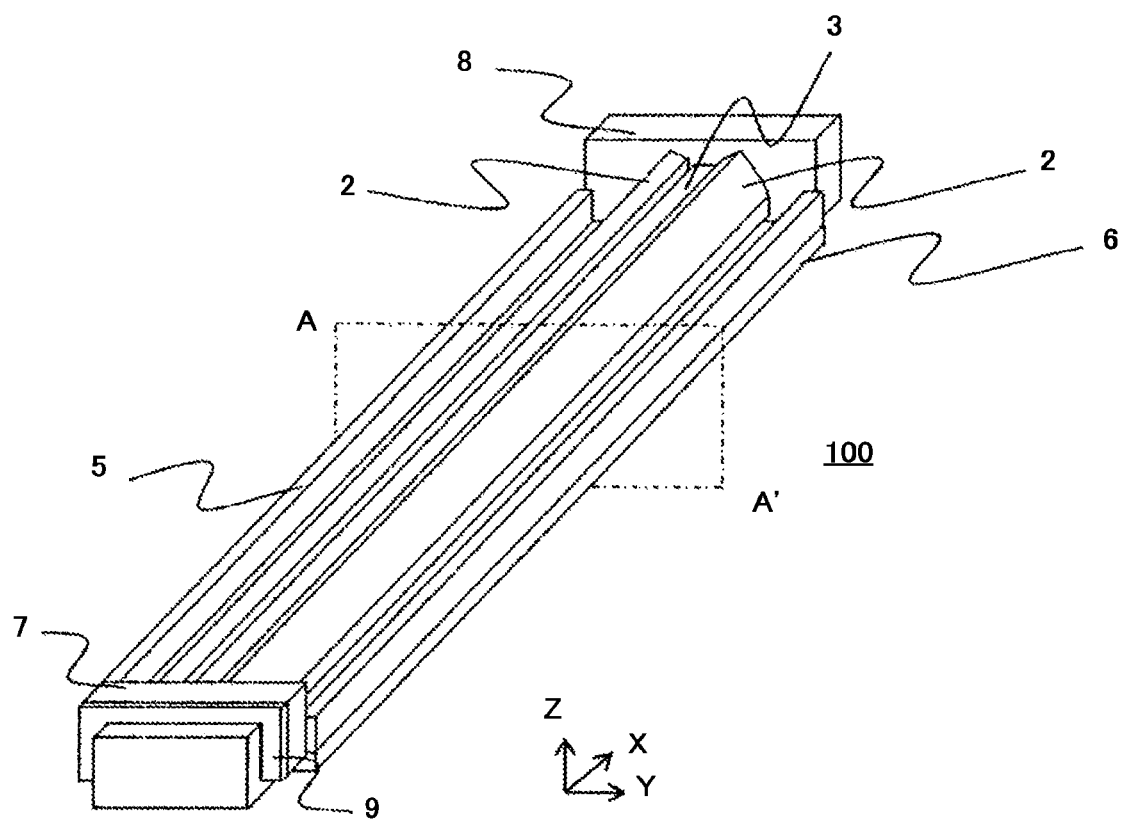
FIG. 1 is a perspective view of an image reading device according to Embodiment 1 of the present disclosure.

An image reading device 100 according to Embodiment 1 of the present disclosure is described below with reference to the drawings. The same or similar components are given the same reference numerals throughout the drawings. In the drawings, X, Y, and Z indicate coordinate axes. The X-axis direction is the main scanning direction (longitudinal direction), the Y-axis direction is the sub-scanning direction (transverse direction), and the Z-axis direction is the reading distance direction. The origin of the X-axis is set to the middle of the length of the image reading device 100 in the main scanning direction. The origin of the Y-axis is set to the middle of the length of the image reading device 100 in the sub-scanning direction. The origin of the Z-axis is the position to which a manuscript M is fed to be scanned by the image reading device 100.

Figure 2:
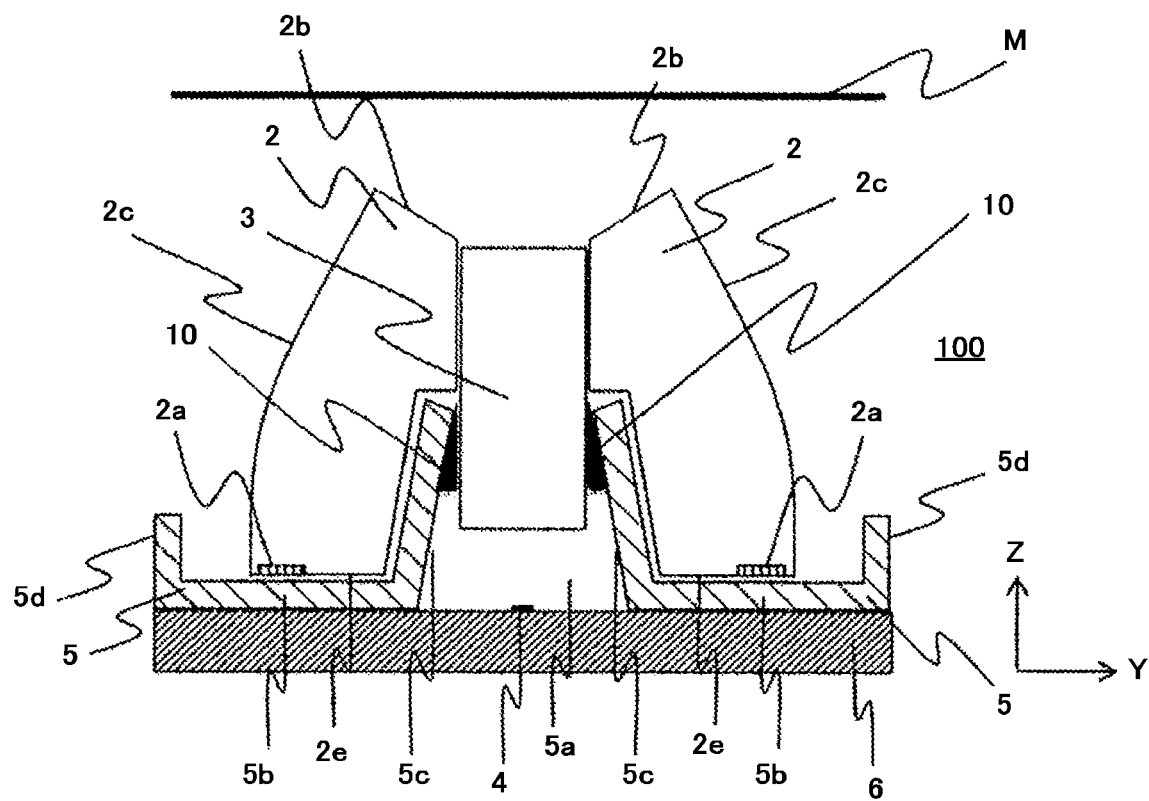
FIG. 2 is a cross-sectional view of the image reading device according to Embodiment 1 of the present disclosure.
Figure 3:
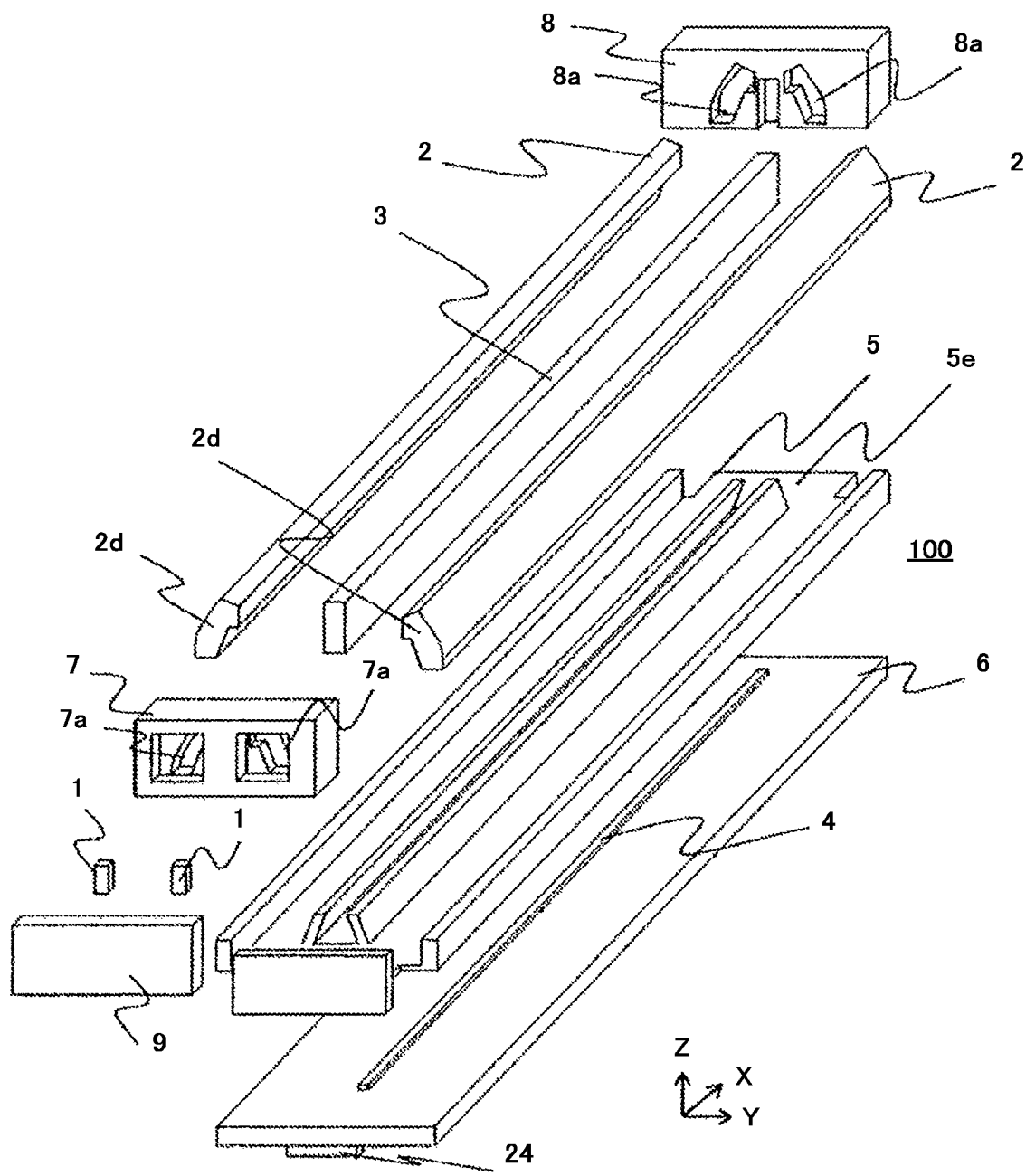
FIG. 3 is an exploded view of the image reading device according to Embodiment 1 of the present disclosure.

FIG. 1 is a perspective view of the image reading device 100 according to Embodiment 1 of the present disclosure. FIG. 2 is a cross-sectional view of the image reading device 100 according to Embodiment 1 of the present disclosure taken along A-A' in FIG. 1. More specifically, FIG. 2 is a cross-sectional view of the image reading device 100 on the Y-Z plane. FIG. 3 is an exploded view of the image reading device 100 according to Embodiment 1 of the present disclosure. The image reading device 100 according to Embodiment 1 of the present disclosure is described with reference to FIGS. 1 to 3.

The manuscript M is a medium to be read (object to be illuminated) carrying image information about, for example, paper money, securities, and other common documents. The image information on the manuscript M is read by the image reading device 100. Light sources 1 are light-emitting devices such as light-emitting diodes (LEDs) or organic electroluminescence (EL) devices that emit red light (R), green light (G), blue light (B), white light (W), ultraviolet light (UV), infrared light (IR), and other light in accordance with the image information to be read.

Transparent bodies 2 are made with, for example, resin or glass, and extend in the X-axis direction. Each transparent body 2 has an incident surface 2d at one end in the X-axis direction. The light sources 1 are placed to face the incident surfaces 2d. Light emitted from the light sources 1 enters the transparent bodies 2 through the incident surfaces 2d and is guided while propagating in the X-axis direction. Thus, each transparent body 2 is also referred to as the light guide 2. Each transparent body 2 has, at one end in the Z-axis direction, a flat surface 2e that extends in the X-axis direction. The flat surface 2e has a light-scattering portion 2a formed in the X-axis direction. The light-scattering portion 2a has a scattering area having a predetermined length in the Y-axis direction. Each transparent body 2 has, at the other end in the Z-axis direction, an emission surface 2b that extends in the X-axis direction and that emits light to the outside of the transparent bodies 2. Each transparent body 2 has a side surface 2c connecting the flat surface 2e and the emission surface 2b and extending in the X-axis direction. The side surface 2c is parabolic and serves as a reflective surface 2c for reflecting light from the light-scattering portion 2a toward the emission surface 2b.

The set of light sources 1 and transparent bodies 2 is also referred to as an illumination device.

An optical imaging system 3 is, for example, rod lenses arranged in an array. The optical imaging system 3 is held between the manuscript M and a base plate 6 on a frame 5 (housing 5) with a retaining member 10, such as an adhesive 10 or a tape 10. The optical imaging system 3 condenses light emitted from the illumination device and reflected by the manuscript M, and forms an image on a sensor IC 4.

The sensor IC 4 receives the light condensed by the optical imaging system 3, and outputs an electrical signal resulting from photoelectric conversion of the light. The sensor IC 4 incorporates a light receiver (photoelectric conversion circuit) A including a semiconductor chip and the like, and the sensor IC 4 also incorporates other components such as a drive circuit B and the like.

The frame 5 between the base plate 6 and the optical imaging system 3 is made with resin or sheet metal. The frame 5 (housing 5) blocks light coming from outside the image reading device 100 into the sensor IC 4 and also has a dustproof effect of preventing dust and the like from entering the sensor IC 4.

The frame 5 (housing 5) has (i) flat surface portions 5b extending in the X-axis direction and having an opening 5a extending in the X-axis direction, (ii) a pair of slopes 5c located along the opening 5a-side edges of the flat surface portions 5b in the Y-axis direction and extending toward the manuscript M-side, and (iii) side walls 5d located, in the Y-axis direction, along the edges of the flat surface portions 5b opposite to the opening 5a and extending toward the manuscript M-side. The pair of slopes 5c slopes such that the width of the opening 5a in the Y-axis direction becomes narrower towards the manuscript M-side. More specifically, the pair of slopes 5c defines a space extending in the X-axis direction. Holder mounts 5e are formed at both ends of the flat surfaces 5b such that the holder mounts 5e are flush with the flat surfaces 5b.

Each transparent body 2 is arranged such that the flat surface 2e is adjacent to the flat surface portion 5b of the frame 5 (housing 5). Each transparent body 2 is located between the slope 5c and the side wall 5d. The side surface (reflective surface) 2c of each transparent body 2 is arranged on the side wall 5d-side. The two transparent bodies 2 are arranged to be line symmetric with respect to the optical imaging system 3.

The rod lens array 3, which serves as the optical imaging system 3, is fitted in the space between the pair of slopes 5c and held on the pair of slopes 5c with the retaining member 10, such as the adhesive 10 or the tape 10.

The sensor IC 4, an external connector 24, and other electronic components such as an application specific integrated circuit (ASIC) 11 are mounted on the base plate 6. The signal processing IC (ASIC) 11 cooperates with a central processing unit (CPU) 12a and a random access memory (RAM) 12b to process a signal resulting from photoelectric conversion output from the sensor IC 4. The CPU 12a, the RAM 12b, and a signal processing circuit 12c in the ASIC 11 are collectively referred to as a signal processor 12. The base plate 6 is fixed on the frame 5 with a tape, an adhesive, or screws.

The base plate 6 is fixed on surfaces of the flat surface portions 5b opposite to surfaces of the flat surface portions 5b of the frame 5 (housing 5) on which the transparent bodies 2 are disposed. In this state, the light receiver of the sensor IC 4 is aligned with the optical axis of the optical imaging system 3.

A holder 7 is provided at first ends of the transparent bodies 2 in the X-axis direction. The first ends of the transparent bodies 2 are inserted into holes 7a of the holder 7. The holder 7 into which the transparent bodies 2 is inserted is fixed on one of the holder mounts 5e of the frame 5 with a tape, an adhesive, or screws. The holder 7 is made with white resin or the like. In this state, the transparent bodies 2 are arranged such that the flat surfaces 2e having the light-scattering portions 2a for the transparent bodies 2 face the flat surfaces 5b of the frame 5.

A holder 8 is provided at the second (opposite) ends of the transparent bodies 2 in the X-axis direction. More specifically, the holder 8 is provided at the ends of the transparent bodies 2 opposite to their ends at which the holder 7 is disposed. The second ends of the transparent bodies 2 are inserted into holes 8a of the holder 8. The holder 8 into which the transparent bodies 2 is inserted is fixed on the other of the holder mounts 5e of the frame 5 with a tape, an adhesive, screws and the like. The holder 8 is made with white resin or the like. In this state, the transparent bodies 2 are arranged such that the flat surfaces 2e having the light-scattering portions 2a for the transparent bodies 2 faces the flat surface portions 5b of the frame 5 (housing 5).

The external connector 24 is used as an interface for input and output signals including an output signal resulting from photoelectric conversion by the sensor IC 4 and a signal obtained by processing the output signal.

A light source base 9 is a base on which the light sources 1 are mounted. The light source base 9 is disposed on a surface of the holder 7 opposite to the surface of the holder 7 into which the transparent bodies 2 is inserted. The light sources 1 are arranged on the base to correspond to the holes 7a in the holder 7 and face the incident surfaces 2d of the transparent bodies 2. In Embodiment 1, each light source 1 is disposed at one end of the corresponding transparent body 2.

Figure 4:
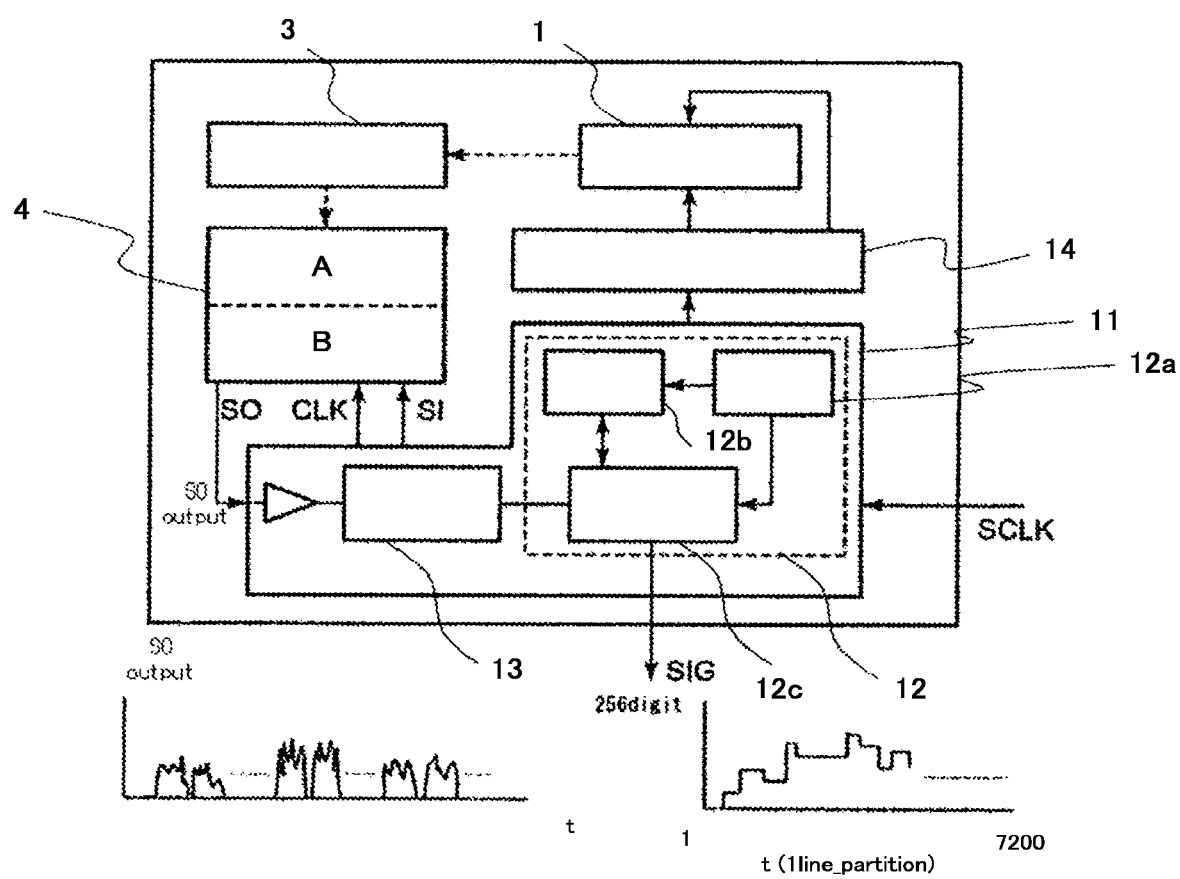
FIG. 4 is a circuit diagram of the image reading device according to Embodiment 1 of the present disclosure.

The operation of the image reading device 100 according to Embodiment 1 of the present disclosure is described. FIG. 4 is a circuit diagram of the image reading device 100 according to Embodiment 1 of the present disclosure. An arrow SCLK directed from the outside to the ASIC 11 indicates a start clock signal, an arrow SO directed from the sensor IC 4 to the ASIC 11 indicates a signal output, an arrow CLK directed from the ASIC 11 to the sensor IC 4 indicates a clock signal, an arrow SI directed from the ASIC 11 to the sensor IC 4 indicates a signal input, and an arrow SIG directed from the signal processing circuit 12c to the outside indicates image information (signal). The lower left graph in FIG. 4 shows the waveform of the signal output SO. In this graph, the horizontal axis indicates time t. The lower right graph in FIG. 4 shows the waveform (one line partition) of the image information SIG output from the signal processing circuit 12c. First, the ASIC 11 transmits a light source turn-on signal to a light source drive circuit 14 in cooperation with the CPU 12a included in the signal processor 12 in the ASIC 11. The light source drive circuit 14 supplies power to each light source 1 for a predetermined time period based on the received light source turn-on signal. Each light source 1 emits light while receiving power. The light emitted from the light source 1 (indicated by the dashed arrow directed from the light source 1 to the optical imaging system 3) enters the transparent bodies 2 through the incident surfaces 2d of the transparent bodies 2. The light propagates (or is guided) while being transmitted or reflected repeatedly and then reaches the light-scattering portions 2a in the transparent bodies 2. The light incident on the light-scattering portions 2a is partially reflected in the Z-axis direction and then exits through the emission parts 2b of the transparent bodies 2 to illuminate the manuscript M. The light emitted to the manuscript M is reflected by the manuscript M and condensed by the optical imaging system 3 to form an image on the sensor IC 4 (indicated by the dashed arrow directed from the optical imaging system 3 to the sensor IC 4). FIG. 4 illustrates, as one example, the sensor IC 4 including the light receiver (photoelectric conversion circuit) A and the drive circuit B. An analog signal resulting from photoelectric conversion is output as a signal output SO from the sensor IC 4, is converted into a digital signal by an A/D converter circuit 13, and then is transmitted to the signal processing circuit 12c included in the signal processor 12. The signal processing circuit 12c cooperates with the CPU 12a to perform signal processing on the signal output SO that is converted into a digital signal to be input into the signal processing circuit 12c, and then the signal processing circuit 12c cooperates with the CPU 12a to output, as image information SIG, a signal obtained by performing the signal processing. The RAM 12b included in the signal processor 12 cooperates with the CPU 12a to temporarily store the signal output SO transmitted to the signal processing circuit 12c. The signal processing circuit 12c may output the inputted signal output SO as it is without processing the signal output SO to convert the signal output into image information.

Figure 5:
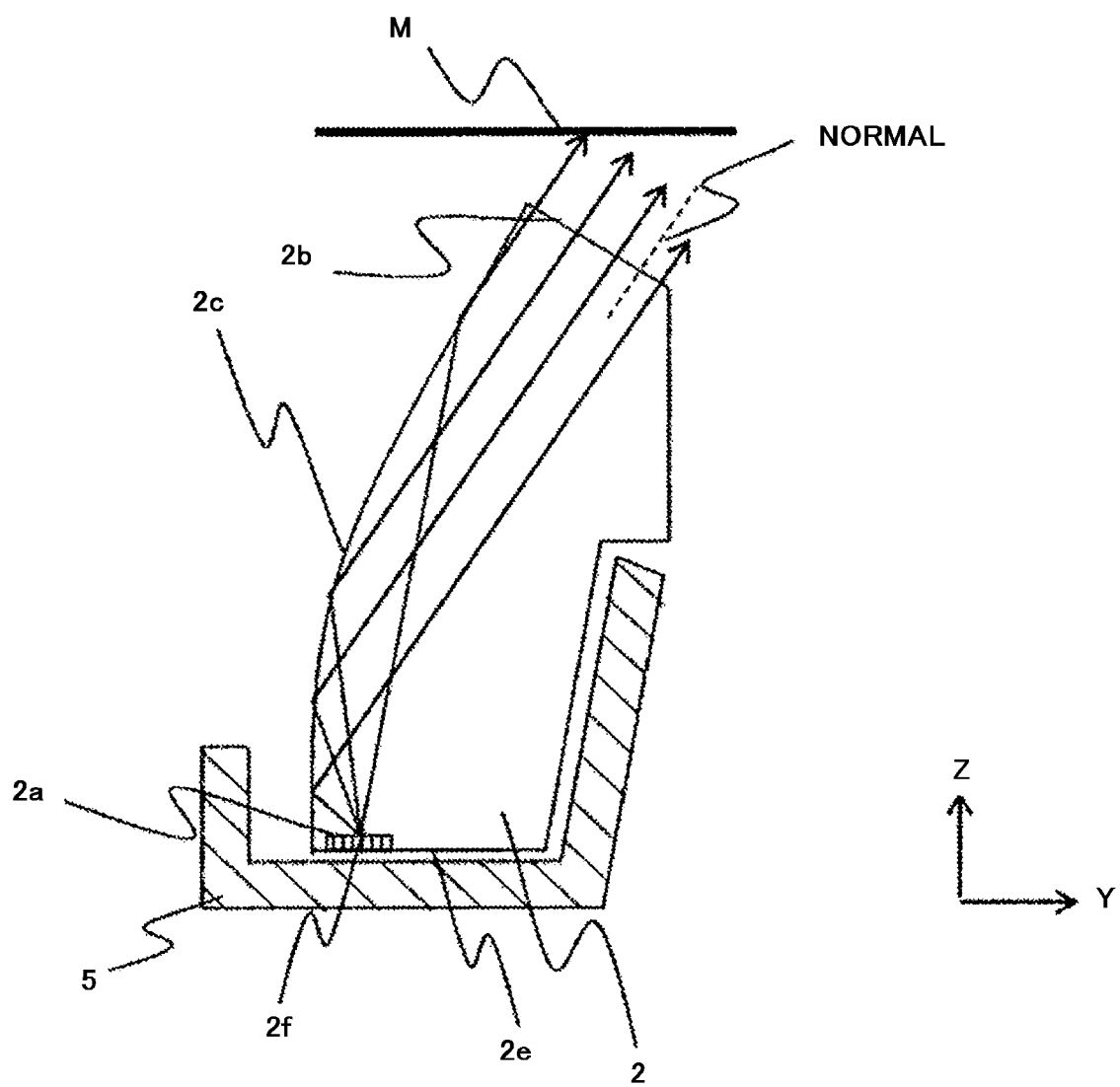
FIG. 5 is a diagram showing illumination paths in the image reading device according to Embodiment 1 of the present disclosure.

The transparent bodies 2 is described in detail. FIG. 5 is a diagram showing illumination paths in the image reading device according to Embodiment 1 of the present disclosure. FIG. 5 is also a cross-sectional view of one transparent body on the Y-Z plane. In FIG. 5, the arrows represent light beams, and each indicates the light direction. The transparent body 2 has the light-scattering portion 2a on the flat surface 2e adjacent to the frame 5. The flat surface 2e extends in the X-axis direction, and the light-scattering portion 2a is also formed in the X-axis direction. The light-scattering portion 2a has a scattering area with a predetermined length in the Y-axis direction. The light-scattering portion 2a is formed as a slightly uneven surface, an embossed surface, or another surface formed by silk-screen printing, and the light-scattering portion 2a reflects or refracts light propagating (or guided) in the X-axis direction through the transparent body 2 to redirect the light propagation to illuminate the manuscript M. In this case, the light-scattering portion 2a serves as a second light source. Accordingly, even though color tones and an amount of emitted light change due to aged deterioration of the light source 1, the change in the color tone and the change in the amount of emitted light occur uniformly across the entire length in the X-axis direction. As a result, unlike a light source array, brightness and color tones do not change locally due to aged deterioration of the light source 1. Further, some light beams are reflected by the transparent body 2 in the light-scattering portion 2a, and some light beams pass through the transparent body 2 in the light-scattering portion 2a. Thus, the flat surface portion 5b of the frame 5 (housing 5) disposed under (outside) the light-scattering portion 2a is preferably made with a highly reflective member such as white resin or metal. When light passes through the light-scattering portion 2a (transparent body 2), such a member can redirect the light to enter the transparent body 2, thus enabling efficient illumination.

The transparent body 2 has the flat emission surface 2b on the side opposite to the flat surface 2e having the light-scattering portion 2a. More specifically, the emission surface 2b faces the flat surface 2e such that the emission surface 2b is inclined with respect to the flat surface 2e. The emission surface 2b extends in the X-axis direction. The transparent body 2 includes the side surface 2c between the emission surface 2b and the flat surface 2e having the light-scattering portion 2a, with the side surface 2c connecting the flat surface 2e and the emission surface 2b. The side surface 2c extends in the X-axis direction and serves as a reflective surface 2c of light the cross section on the Y-Z plane of which has a paraboloid shape. The light-scattering portion 2a is formed at a focus 2f of the reflective surface 2c in Y-Z cross section.

The light incident on the incident surface 2d of the transparent body 2 is guided while propagating through the transparent body, and reflected by the light-scattering portion 2a. Among the light beams reflected by the light-scattering portion 2a, light beams reflected towards the emission surface 2b is further reflected by the reflective surface 2c and then travel to the emission surface 2b. The light beams reflected by the reflective surface 2c travel to the emission surface 2b as collimated light since the light-scattering portion 2a is formed at the focus 2f of the reflective surface 2c. The emission surface 2b is flat. The direction of a normal to the flat emission surface 2b is the same as the direction of the collimated light reflected by the reflective surface 2c. In other words, the direction of a normal to the flat emission surface 2b is parallel with the direction of the collimated light reflected by the reflective surface 2c. Thus, the collimated light traveling to the emission surface 2b is not reflected toward the inside of the transparent body 2 by the emission surface 2b, but the whole of the collimated light exits the transparent body 2 through the emission surface 2b to illuminate the manuscript M.

The light illuminating the manuscript M is collimated light from the emission surface 2b of the transparent body 2. Thus, the brightness of the illumination light that illuminates the manuscript M remains unchanged even though the distance between the manuscript M and the reader 10 changes. This structure enables stable illumination with a great depth of illumination and high efficiency.

A decrease in a curvature of the paraboloid shape of the reflective surface 2c results in an increase in an angle at which the reflective surface 2c reflects the light coming from the light-scattering portion 2a, thereby causing light to leak from the reflective surface 2c through the outside of the transparent body 2. To suppress such light leakage, the reflective surface 2c may be formed as a mirror surface by performing metal deposition process or the like on the side surface 2c from outside, where the side surface 2c is the reflective surface 2c.

In Embodiment 1, incident light coming from the light source 1 disposed at the end of each transparent body 2 is scattered through the light-scattering portion 2a, and the scattered light is reflected by the reflective surface 2c.

An array of multiple light sources 1 may be arranged in the X-axis direction at the position corresponding to the light-scattering portion 2a such that the array of multiple light sources 1 is positioned at the focus 2f for the reflective surface 2c, thereby producing the same advantageous effects as described above. In this case, the light-scattering portion 2a is not formed in the transparent body 2. The light sources 1 including LED or the like have predetermined light emitting areas. Even in a case in which light emitted from the light emitting areas of the light sources 1 passes through the focus 2f of the reflective surface 2c, the same operation effects as described above can be obtained. Also, in a case in which imaginary light beams (light beams of imaginary straight lines) connecting the reflective surface 2c and the focus 2f for the reflective surface 2c pass through the light emitting areas of the light sources 1, the same functional effects as described above can be obtained.

Embodiment 2

Figure 6:
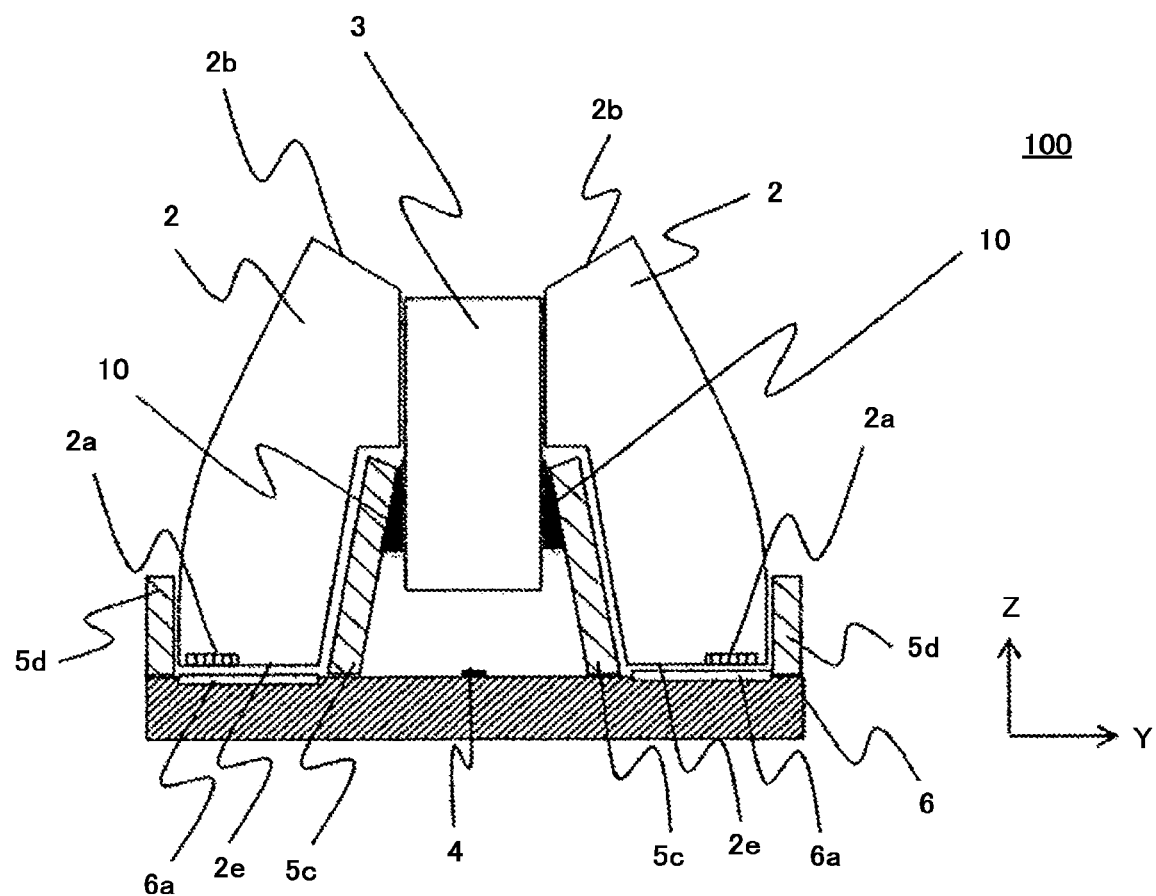
FIG. 6 is a cross-sectional view of an image reading device according to Embodiment 2 of the present disclosure.
Figure 7:
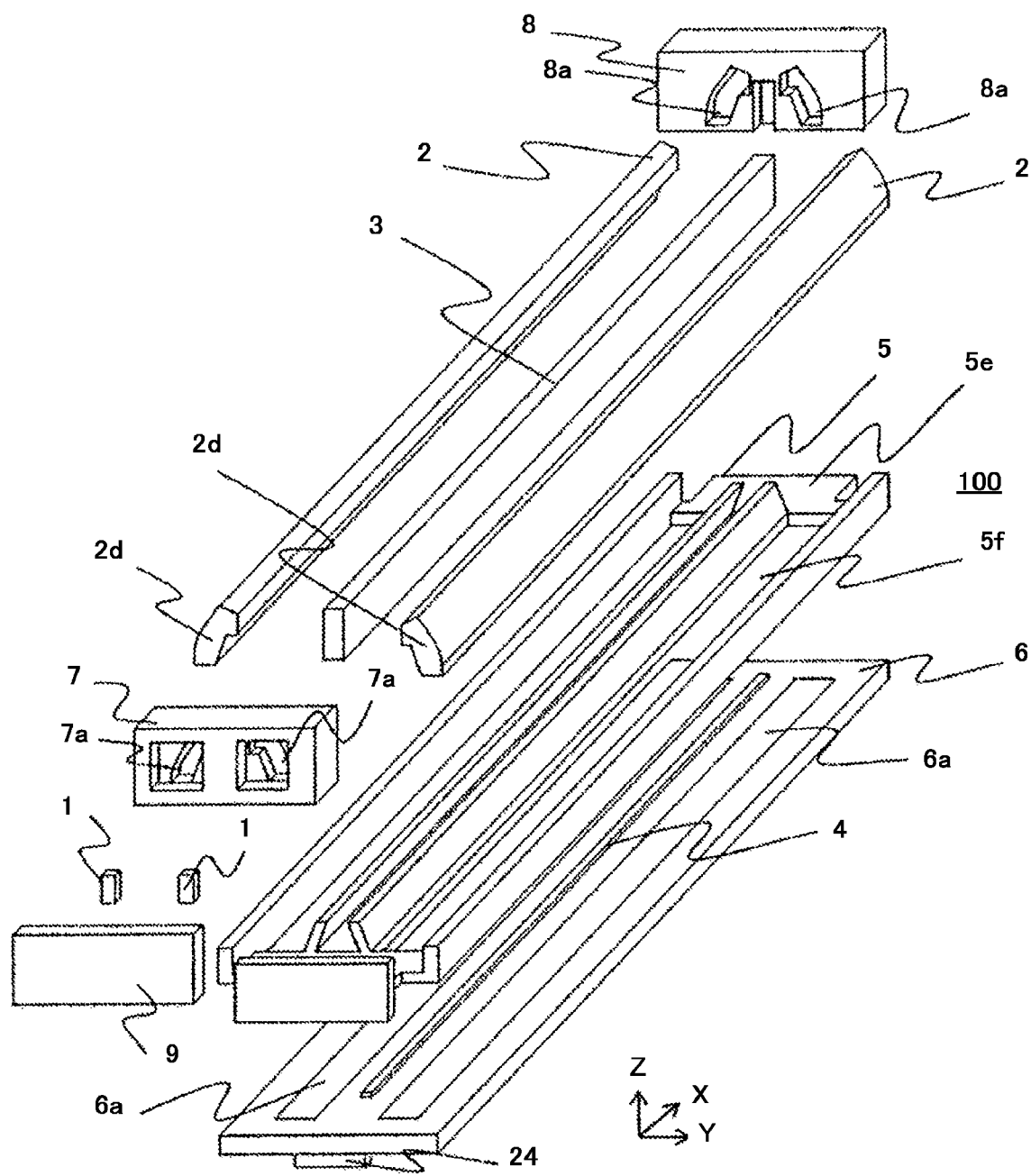
FIG. 7 is an exploded view of the image reading device according to Embodiment 2 of the present disclosure.

An image reading device 100 according to Embodiment 2 of the present disclosure is described. FIG. 6 is a cross-sectional view of the image reading device 100 according to Embodiment 2 of the present disclosure. FIG. 6 is a cross-sectional view of the image reading device 100 on the Y-Z plane. FIG. 7 is an exploded view of the image reading device 100 according to Embodiment 2 of the present disclosure. In FIGS. 6 and 7, the same or similar components also shown in FIGS. 1 to 5 are assigned the same reference signs, and the descriptions of these components are omitted.

In the image reading device 100 according to Embodiment 2, the flat surface portions 5b of the frame 5 (housing 5) described in Embodiment 1 has through-holes 5f extending in the X-axis direction. The through-holes 5f are formed by penetrating the areas of the flat surface portions 5b at least corresponding to the light-scattering portions 2a in the transparent bodies 2. Reflective areas 6a (light reflectors 6a) with high reflectance are formed on portions of the surface of the base plate 6 corresponding to the through-holes 5f, and the reflective areas 6a are formed by applying a coating such as a white resist. The reflective areas 6a may be formed by performing metal patterning or mirror finishing on the surface of the base plate 6. In Embodiment 2, the frame 5 (housing 5) is made with blackish resin or with a metal on which surface processing is performed so as to have a blackish surface, so that the surface of the frame 5 has a low reflectance.

The frame 5 (housing 5) in Embodiment 1 is made with a highly reflective material. In this case, when a large amount of light is transmitted by the optical imaging system 3 and the base plate 6 has a nonzero reflectance, light transmitted by the optical imaging system 3 may be reflected by the base plate 6 and then further reflected by the frame 5 (housing 5) and enter the sensor IC 4, within a space surrounded by the optical imaging system 3, the base plate 6, and the frame 5 (housing 5). Such an unintended stray light path may degrade a read image.

In a case in which the frame 5 (housing 5) is made to have a low reflectance in the structure described in Embodiment 1, in order to enable efficient illumination by making the light passing through the light-scattering portions 2a or the light penetrating through the transparent bodies 2 reenter the transparent bodies 2, a highly reflective member such as a white tape, a white resin plate, or a white coating may be added to corresponding areas of the flat surface portion 5b of the frame 5 (housing 5) under the light-scattering portions 2a. However, such an additional member may arises a problem in complicate the structure.

To avoid these problems in Embodiment 2, the frame 5 (housing 5) is made such that a surface of the flame 5 has a low reflectance and the through-holes 5f are formed on the frame 5 (housing 5), and the base plate 6 is made to have the reflective areas 6a that has a high reflectance and that are formed on the areas corresponding to the through-holes 5f. Because the reflective areas 6a with a high reflectance are formed on the areas of the base plate 6 that correspond to the through-holes 5f, light passing through the light-scattering portions 2a in the transparent bodies 2 can be reflected by the reflective areas 6a to be returned to the inside of the transparent bodies 2. Thus, although the frame 5 (housing 5) has a low reflectance, this structure in the present embodiment also performs the same efficient illumination as in Embodiment 1.

Embodiment 3

Figure 8A:
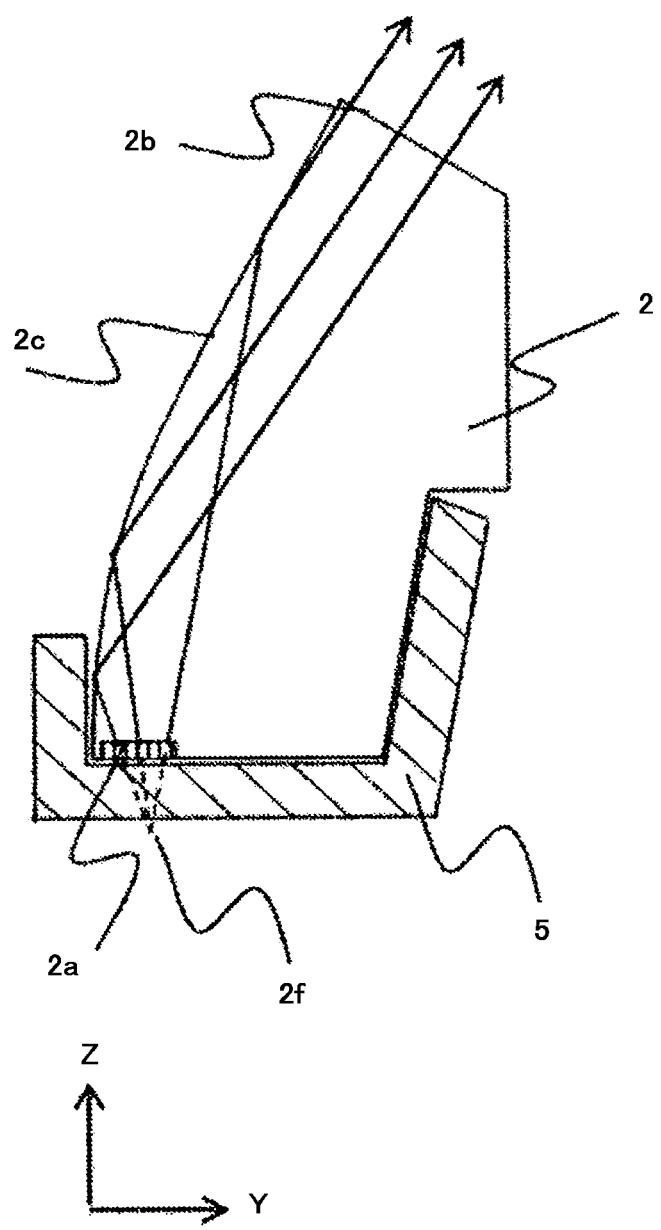
FIG. 8A is a diagram showing illumination paths in an image reading device according to Embodiment 3 of the present disclosure.
Figure 8B:
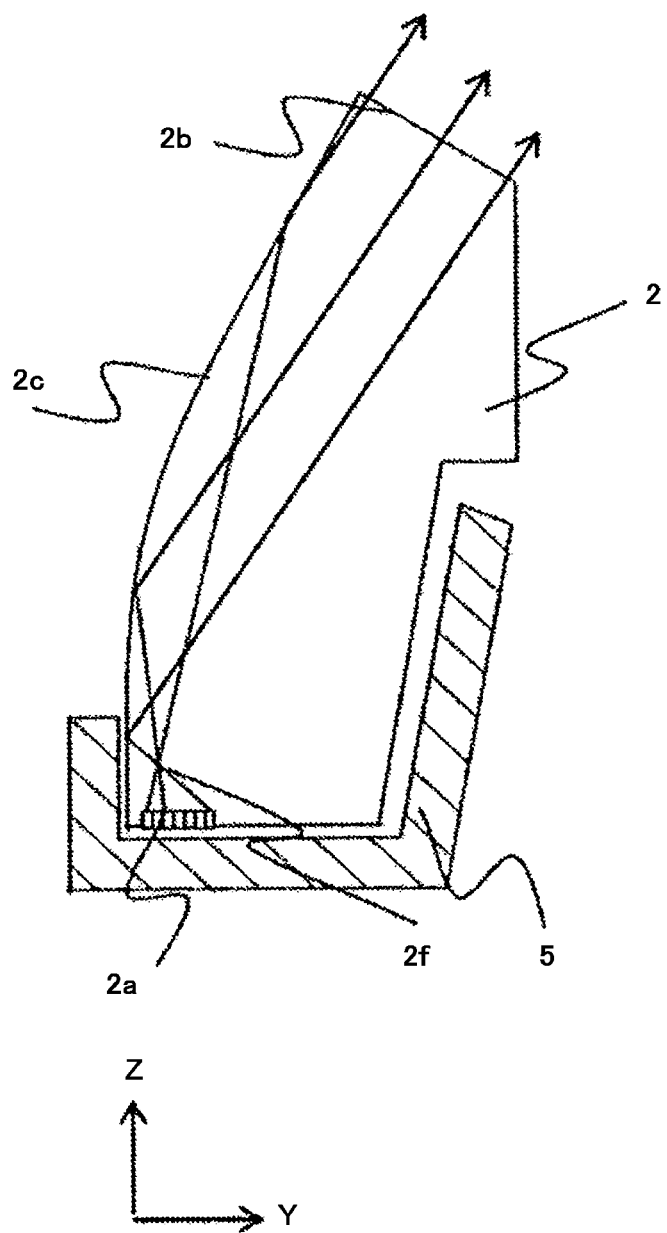
FIG. 8B is a diagram showing illumination paths in the image reading device according to Embodiment 3 of the present disclosure.

An image reading device 100 according to Embodiment 3 of the present disclosure is described. FIG. 8 (FIG. 8A and FIG. 8B) are diagrams showing illumination paths in the image reading device according to Embodiment 3 of the present disclosure. FIG. 8 (FIG. 8A and FIG. 8B) are also cross-sectional views of a transparent body 2 on the Y-Z plane. In FIG. 8 (FIG. 8A and FIG. 8B), arrows indicate light beams, each showing the light directions. In FIG. 8 (FIG. 8A and FIG. 8B), the same or similar components also shown in FIGS. 1 to 5 are assigned the same reference signs, and the descriptions of these components are omitted.

In Embodiment 1, the position of the light-scattering portion 2a in each transparent body 2 is the same as the position of the focus of the reflective surface 2c. A structure described below enables the same operation effects as in Embodiment 1 even though the position of the light-scattering portion 2a in the transparent body 2 differs from the position of the focus for the reflective surface 2c.

FIG. 8A shows illumination paths formed when the position of the focus 2f of the reflective surface 2c is farther from the reflective surface 2c than the position of the light-scattering portion 2a is. Normally, light emitted from the position of the focus 2f diverges at the position of the light-scattering portion 2a. When light reflected by the light-scattering portion 2a has art imaginary light path passing from the focus 2f through the scattering area of the light-scattering portion 2a with respect to the Y-axis directional length of the scattering area, the light reflected by the light-scattering portion 2a is reflected by the parabolic reflective surface 2c and directed to the emission surface 2b as substantially collimated light.

FIG. 8B shows illumination paths formed when the position of the focus 2f of the reflective surface 2c is nearer to the reflective surface 2c than the position of the light-scattering portion 2a is. Normally, light scattered from the position of the focus 2f diverges at the position of the light-scattering portion 2a. The light reflected within the Y-axis directional length range of the scattering area of the light-scattering portion 2a converges to the position of the focus 2f, is reflected by the parabolic reflective surface 2c, and then is directed to the emission surface 2b as substantially collimated light.

When the position of the focus 2f is different from the position of the light-scattering portion 2a, the light-scattering portion 2a is provided at a position at which light actually or imaginarily passing through the focus 2f travels through the scattering area of the light-scattering portion 2a, whereby the light traveling to the emission surface 2b becomes substantially collimated light.

As shown in FIG. 8A, when the position of the focus 2f of the reflective surface 2c is farther from the reflective surface 2c than the position of the light-scattering portion 2a is, the height of the transparent body 2 in the Z-axis direction can be reduced. As shown in FIG. 8B, when the position of the focus 2f of the reflective surface 2c is nearer to the reflective surface 2c than the position of the light-scattering portion 2a is, the cross-sectional area of the cross section of the transparent body 2 (on the Y-Z plane) can be increased. The resultant increased area of the incident surface 2d enables an increase in the number of light sources 1 to be installed, thus enabling brighter illumination.

Embodiment 4

Figure 9A:
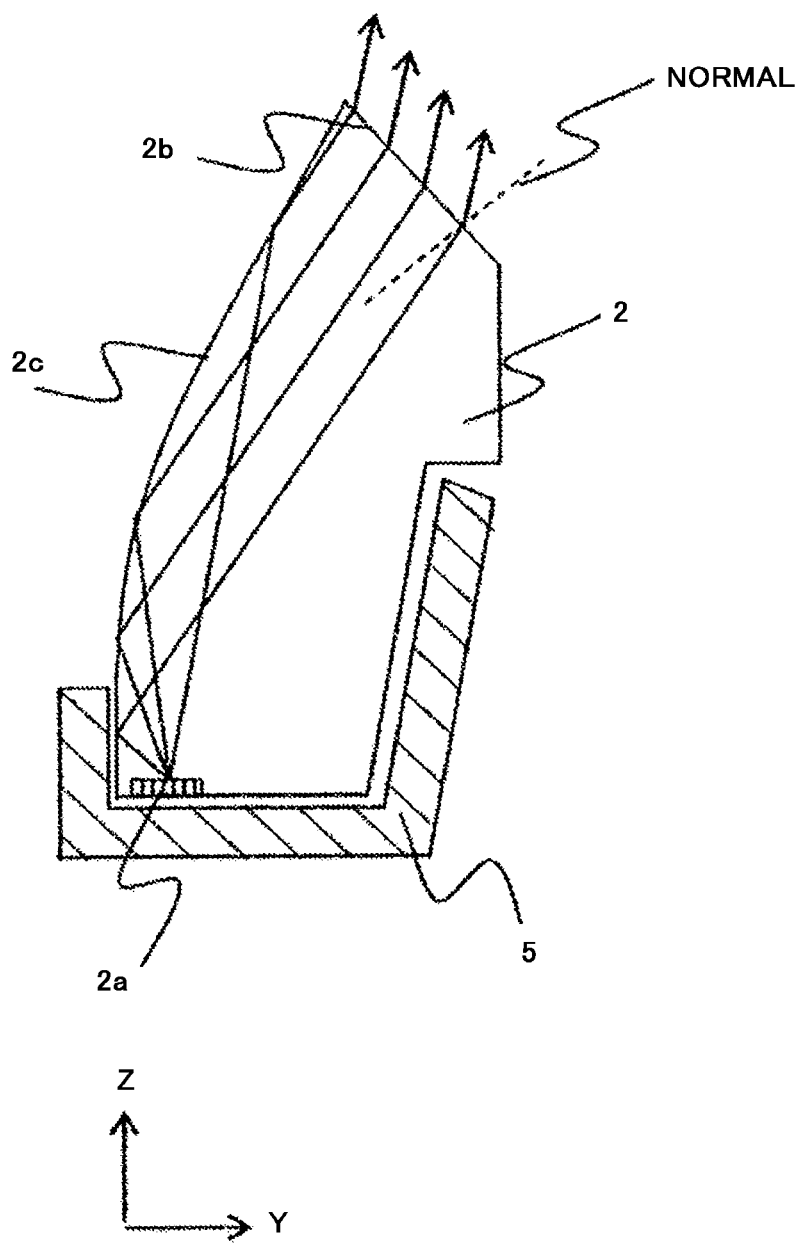
FIG. 9A is a diagram showing illumination paths in an image reading device according to Embodiment 4 of the present disclosure.
Figure 9B:
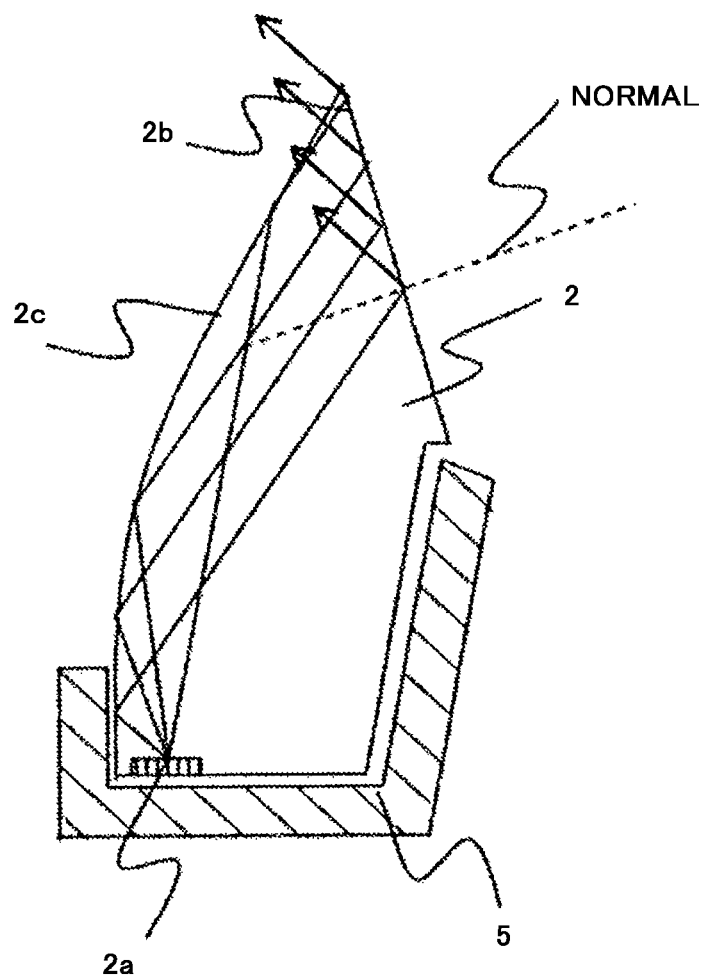
FIG. 9B is a diagram showing illumination paths in the image reading device according to Embodiment 4 of the present disclosure.

An image reading device 100 according to Embodiment 4 of the present disclosure is described. FIG. 9 (FIG. 9A and FIG. 9B) are diagrams showing illumination paths in the image reading device according to Embodiment 4 of the present disclosure. FIG. 9 (FIG. 9A and FIG. 9B) are also cross-sectional views of a transparent body 2 on the Y-Z plane. In FIG. 9, arrows indicate light beams, showing the light directions. In FIG. 9 (FIG. 9A and FIG. 9B), the same or similar components also shown in FIGS. 1 to 5 are assigned the same reference signs, and the descriptions of these components are omitted.

When a manuscript such as a hologram is read, there is an optimum illumination angle for reading the manuscript. However, the greater an angle of illumination from the transparent body 2 of the present disclosure is, the larger an angle at which light from the light-scattering portion 2a enters the reflective surface 2c is. Accordingly, the light no longer satisfies the conditions of total reflection by the reflective surface 2c, thereby causing an increase in an amount of light leaking from the reflective surface 2c to the outside of the transparent body 2 (side surface 2c) of the transparent body 2.

Metal deposition may be performed on the side surface 2c so that the reflective surface 2c is made as a mirror surface. The resulting surface prevents a light leakage from the transparent body 2. However, the surface processing can complicate the process of manufacturing the transparent bodies 2.

In Embodiment 4, as shown in FIG. 9A, the emission surface 2b is formed to make an angle between the direction of a normal to the flat emission surface 2b and the direction of collimated light from the reflective surface 2c to the emission surface 2b. This structure allows light to be emitted from the emission surface 2b through the outside of the transparent body 2 in a direction different from the direction of the collimated light from the reflective surface 2c to the emission surface 2b.

As shown in FIG. 9B, when the angle between the direction of the normal to the flat emission surface 2b and the direction of collimated light traveling from the reflective surface 2c to the emission surface 2b exceeds a predetermined angle, collimated light traveling from the reflective surface 2c to the emission surface 2b is totally reflected by the emission surface 2b, so that the transparent body 2 cannot emit light.

Thus, the angle θ between the direction of the normal to the flat emission surface 2b and the direction of collimated light from the reflective surface 2c to the emission surface 2b must satisfy the following formula:

$$\theta < \sin^{-1}(1/n) \quad (1)$$

where n is the refractive index of the material used for the transparent body 2.

In formula (1), when the transparent body refractive index n satisfies the condition that n−1.5, the angle θ satisfies the condition that θ<41.8 degrees.

Under the condition of formula (1) as described above, the angle between the direction of a normal to the flat emission surface 2b and the direction of collimated light traveling from the reflective surface 2c to the emission surface 2b is defined, thereby enabling light to be emitted from the emission surface 2b to the outside of the transparent body 2 in any direction.

Embodiment 5

Figure 10:
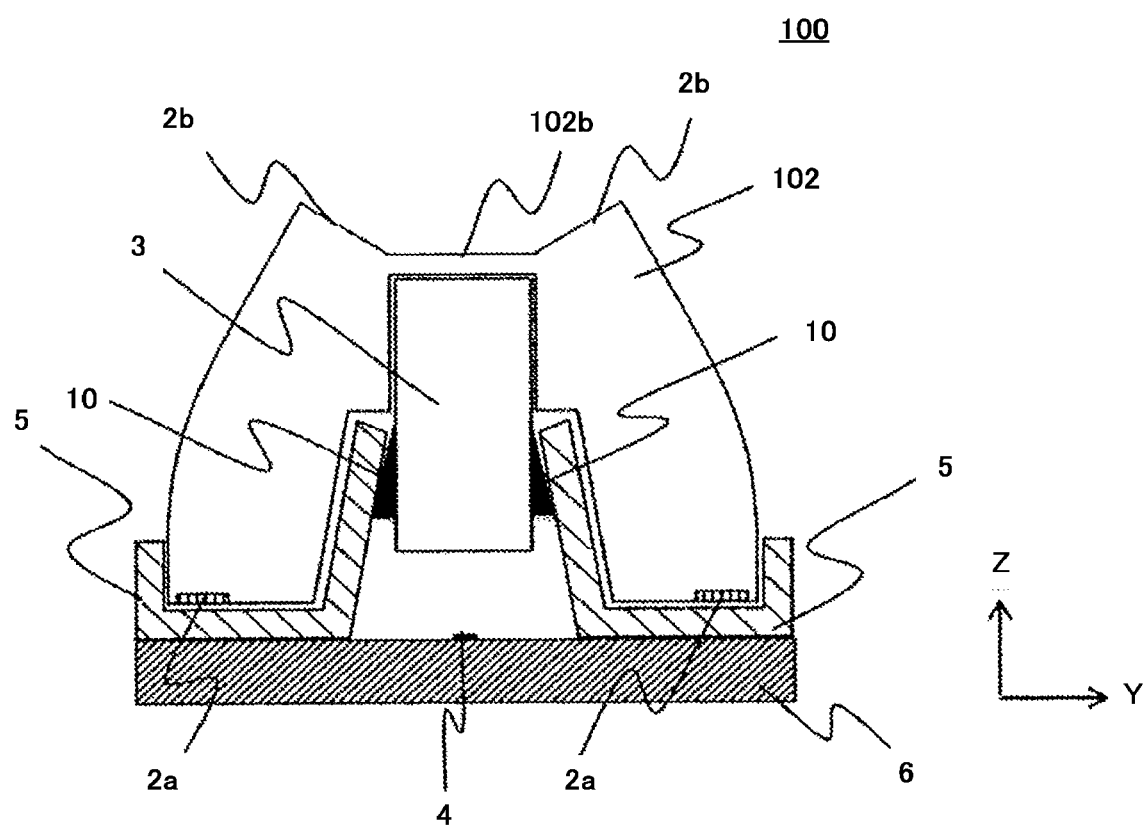
FIG. 10 is a cross-sectional view of an image reading device according to Embodiment 5 of the present disclosure.

An image reading device 100 according to Embodiment 5 of the present disclosure is described. FIG. 10 is a cross-sectional view of the image reading device 100 according to Embodiment 5 of the present disclosure. More specifically, FIG. 10 is a cross-sectional view of the image reading device 100 on the Y-Z plane. In FIG. 10, the same or similar components also shown in FIGS. 1 to 5 are assigned the same reference signs, and the descriptions of these components are omitted.

In Embodiment 1, the two transparent bodies 2 are line symmetric with respect to the optical imaging system 3. A transparent body 102 of Embodiment 5 is formed by connecting the emission surfaces 2b of two transparent bodies 2. A bridge 102b connects the edges of the emission surfaces 2b of the two transparent bodies 2 located on the optical imaging system 3-side. The bridge 102b is structured cover the optical imaging system 3. As a result, the optical imaging system 3 and the sensor IC 4 are contained in the transparent body 102, whereby it is expectable to prevent the entry of dust.

The other operation effects of the image reading device 100 according to Embodiment 5 are the same as in Embodiment 1.

Embodiment 6

Figure 11:
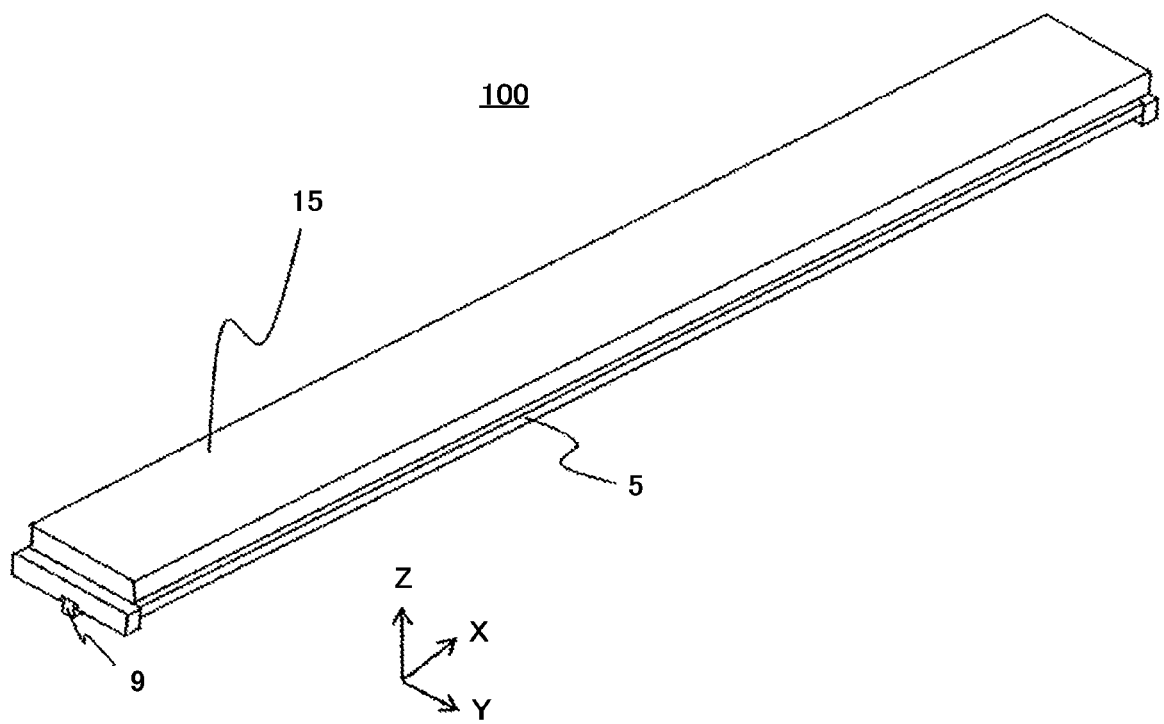
FIG. 11 is a perspective view of an image reading device according to Embodiment 6 of the present disclosure.
Figure 12:
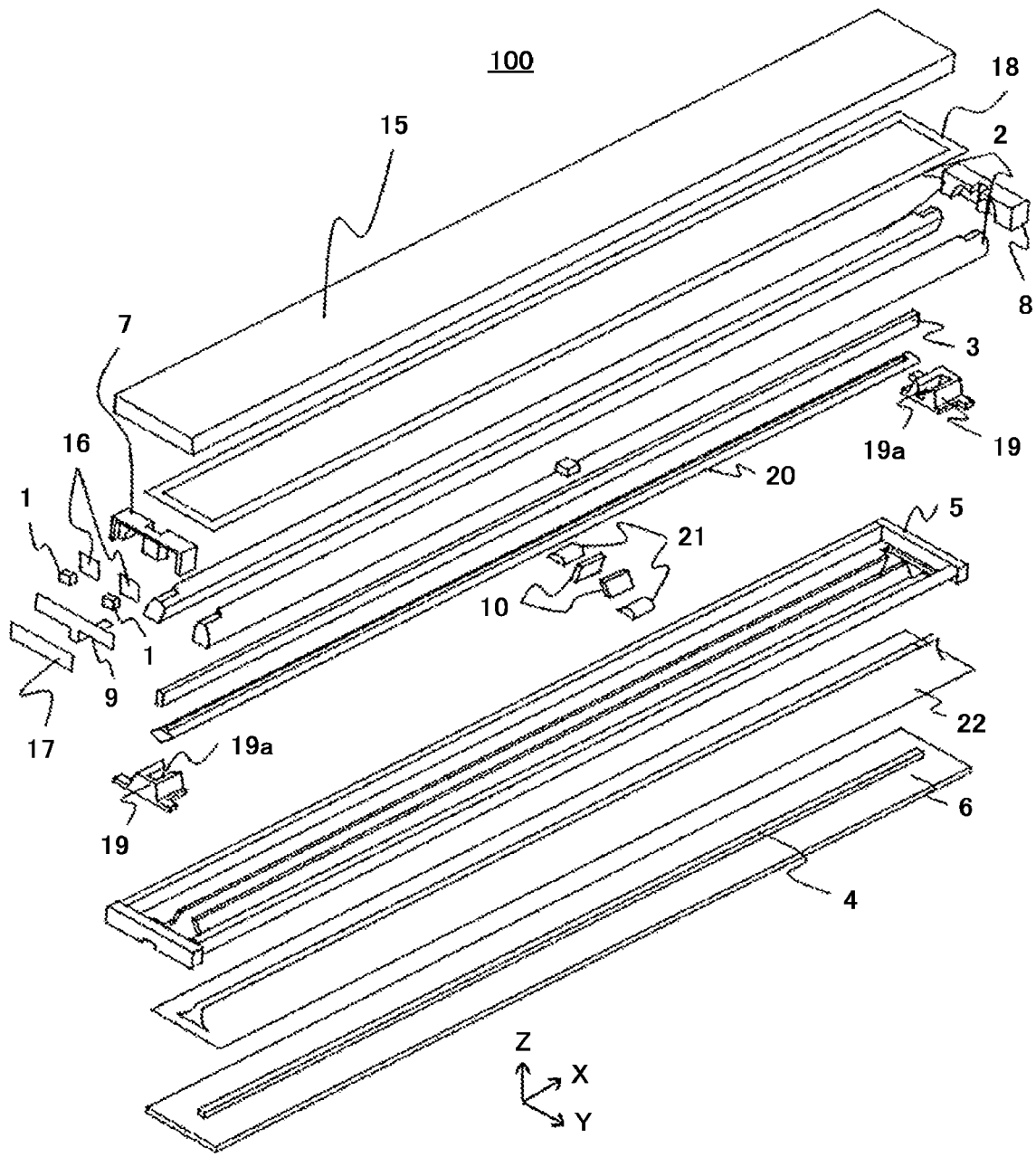
FIG. 12 is an exploded view of the image reading device according to Embodiment 6 of the present disclosure.
Figure 13:
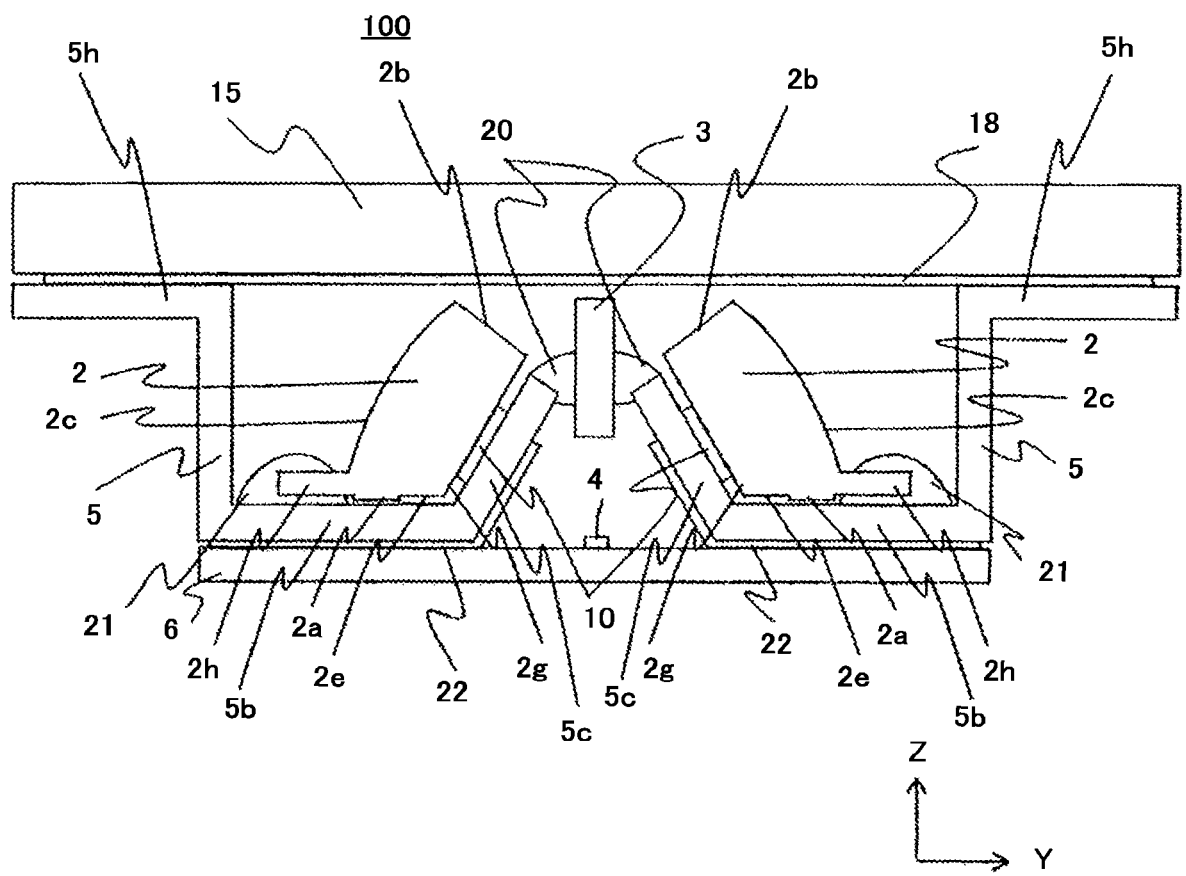
FIG. 13 is a Y-Z plane cross-sectional view of the image reading device according to Embodiment 6 of the present disclosure.
Figure 14A:
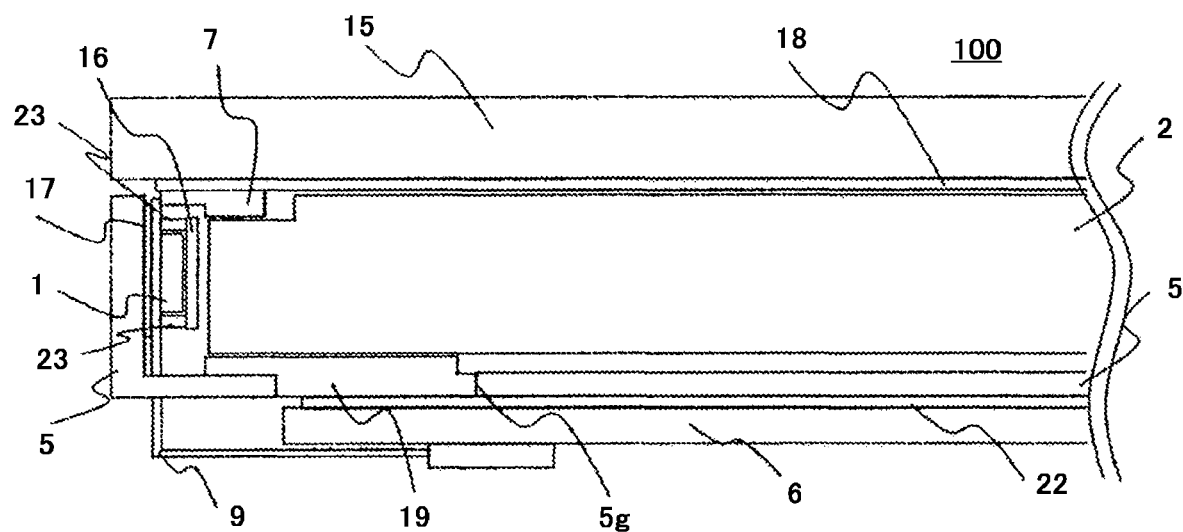
FIG. 14A is an X-Z cross-sectional view of the image reading device according to Embodiment 6 of the present disclosure.
Figure 14A:
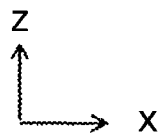
Figure 14B:
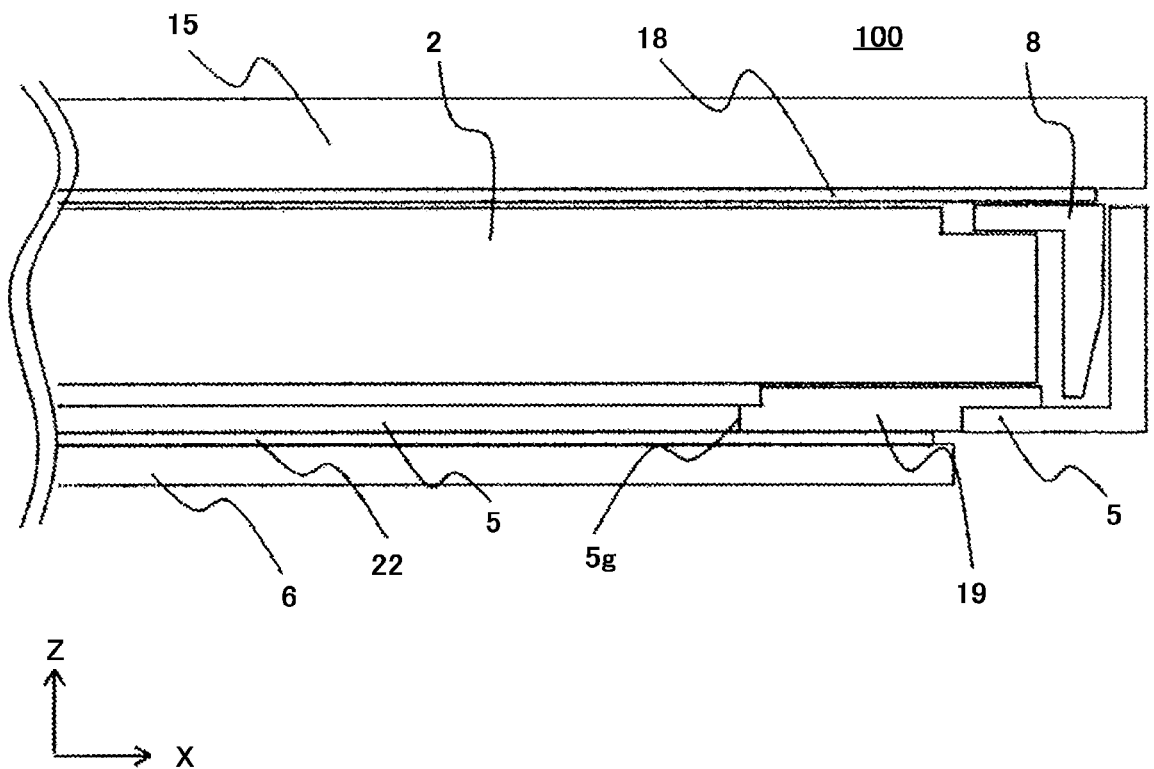
FIG. 14B is an X-Z cross-sectional view of the image reading device according to Embodiment 6 of the present disclosure.

An image reading device 100 according to Embodiment 5 of the present disclosure is described. FIG. 11 is a perspective view of the image reading device according to Embodiment 6 of the disclosure. FIG. 12 is an exploded view of the image reading device according to Embodiment 6 of the present disclosure. FIG. 13 is a cross-sectional view of the image reading device according to Embodiment 6 of the present disclosure on the Y-Z plane. FIG. 14 (FIG. 14A and FIG. 14B) are cross-sectional views of the image reading device according to Embodiment 6 of the present disclosure on the X-Z. FIG. 13 is a Y-Z cross-sectional view, in particular, showing a middle portion of the transparent body 2 in the X-axis direction. FIG. 14A is an X-Z cross-sectional view of the image reading device according to Embodiment 6, showing the end at which light sources 1 are arranged, and FIG. 14B is an X-Z cross-sectional view of the image reading device according to Embodiment 6, showing the end opposite to the part shown in FIG. 14A. In FIGS. 11 to 14 (FIG. 14A and FIG. 14B), the same or similar components also shown in FIGS. 1 to 5 are assigned the same reference signs, and the descriptions of these components are omitted.

The light sources 1 are mounted on the surface of the light source base 9 that faces the transparent body 2. The light sources 1 each have an infrared cut filter (IRCF) 16 that is disposed at the side facing the transparent body 2. The IRCF 16 is bonded to the light source base 9 with an adhesive 23. The adhesive 23 is applied to a part other than the light source 1. A radiator sheet 17 is disposed such that the radiator sheet 17 coming into contact with the surface of the light source base 9 that is opposite to the surface on which the light sources 1 are mounted. The light source base 9 assembled in this manner is inserted in and bonded to the holder 7 such that the light sources 1 faces the incident surfaces 2d of the transparent bodies 2. In this state, the radiator sheet 17 is in contact with the frame 5 (housing 5).

As described in Embodiment 1, the holder 7 receives one end of each transparent body 2 in the X-axis direction, whereas the holder 8 receives the other end.

The rod lens array 3 has both ends in the X-axis direction inserted in recesses 19a of supports 19 formed such that the recesses 19a are concave in the Z-axis direction. The supports 19 are fitted in spaces 5g formed at both ends of the frame 5 (housing 5) in the X-axis direction.

The base plate 6 is bonded to the frame 5 (housing 5) with a tape 22. In this state, the supports 19 fitted in the spaces 5g in the frame 5 (housing 5) are simultaneously bonded to the base plate 6 with the tape 22. Additionally, with the supports 19 bonded to the base plate 6, the rod lens array 3 is bonded to the frame 5 (housing 5) by applying an adhesive 20 to the periphery of the rod lens array 3. In FIG. 12, the shape of the adhesive 20 indicates the shape of the adhesive 20 applied to the rod lens array 3.

The side surface of each transparent body 2 opposite to the reflective surface 2c includes a flat sloping surface 2g that is inclined such that the sloping surface 2g is more and more away from the reflective surface 2c from the light-scattering portion 2a towards the emission surface 2b. The sloping surface 2g is bonded with the adhesive 10 to the slope 5c of the frame 5 (housing 5) in a middle portion of the transparent body 2 in the X-axis direction. Additionally, the transparent body 2 has a protrusion 2h in the middle portion in the X-axis direction. The protrusion 2h extends in the transverse direction from the edge of the flat surface 2e adjacent to the reflective surface 2c. The protrusion 2h is bonded to the flat surface portion 5b of the frame 5 (housing 5) with an adhesive 2l. In this manner, the middle portion of the transparent body 2 in the X-axis direction is fixed to the frame 5 (housing 5).

A glass plate 15 is bonded to the frame 5 (housing 5) by applying an adhesive 18 or an adhesive tape to a periphery 5h of the opening in the frame 5 (housing 5) adjacent to the manuscript M.

A middle portion of the transparent body 2 in the X-axis direction is bonded to the frame 5 (housing 5), and ends of the transparent body 2 are inserted into the holder 7 and the holder 8. Thus, even if the transparent body 2 thermally expands or contracts due to temperature changes, the transparent body 2 receives no mechanical stress since the ends of the transparent body 2 can slide within the holders 7 and 8. The image reading device is thus highly reliable.

The first to sixth embodiments are typical examples, and may be combined with one another.

REFERENCE SIGNS LIST

1 Light source
2 Transparent body (light guide)
2a Light-scattering portion

2b Emission surface
2c Reflective surface (side surface)
2d Incident surface
2e Flat surface
2f Focus
2g Sloping surface
2h Protrusion
3 Optical imaging system (rod lens array)
4 Sensor IC (light receiving element)
5 Frame (housing)
5a Opening
5b Flat surface portion
5c Slope
5d Side wall
5e Holder mount
5f Through-hole
5g Space
5h Periphery
6 Base plate
6a Reflective area (light reflector)
7 Holder
7a Hole
8 Holder
8a Hole
9 Light source base
10 Retaining member (adhesive, tape)
11 ASIC (signal processing IC)
12 Signal processor (central processing unit)
12a CPU
12b RAM
12c Signal processing circuit
13 A/D converter circuit
14 Light source drive circuit
15 Glass plate
16 Infrared cut filter (IRCF)
17 Radiator sheet
18 Adhesive
19 Support
19a Recess
20 Adhesive
21 Adhesive
22 Tape
23 Adhesive
24 External connector
100 Image reading device
102 Transparent body (light guide)
102b Bridge
A Light receiver (photoelectric conversion circuit)
B Drive circuit
M Manuscript (object to be illuminated)

The invention claimed is:

1. An illumination device, comprising:
a light source; and
a rod-like light guide to guide incident light toward an object to be illuminated, the rod-like light guide extending in a longitudinal direction, wherein
the light source is placed at an end of the light guide in the longitudinal direction,
the light guide comprises:
an incident surface to receive light emitted from the light source, the incident surface being located at the end in the longitudinal direction;
an emission surface to emit light incident on the light guide toward the object to be illuminated, the emission surface being flat and extending in the longitudinal direction;
a reflective surface with a paraboloid shape to reflect light from a focus of the paraboloid shape or light passing through the focus from a predetermined area toward the emission surface; and
a light-scattering portion, having a predetermined scattering area, to scatter the incident light received by the incident surface and then reflect the light toward the reflective surface,
the light-scattering portion is provided on a light guide surface of the light guide,
the light-scattering portion is located near to the reflective surface extending in the longitudinal direction, the reflective surface connecting the light guide surface and the emission surface,
the light-scattering portion is placed at the focus of the paraboloid shape or at a position at which the light reflected by the scattering area of the light-scattering portion passes through the focus of the paraboloid shape, and
the light reflected by the reflective surface toward the emission surface travels in a direction parallel with a direction of a normal to the emission surface that is flat and that extends in the longitudinal direction, wherein
both the object to be illuminated and the light guide surface of the light guide on which the light-scattering portion is provided are parallel to a horizontal plane.

2. An image reading device, comprising:
the illumination device according to claim 1;
a light receiving element to convert received light to an electrical signal;
an optical imaging system to form, on the light receiving element, an image of light emitted from the illumination device and reflected by the object to be illuminated; and
a housing accommodating or holding the illumination device, the light receiving element, and the optical imaging system.

3. The image reading device according to claim 2, wherein
the light guide surface is a light guide flat surface that is flat,
the housing has a housing flat surface portion that is located to face the light guide flat surface, the housing flat surface portion being flat,
the image reading device further comprises a base plate placed on a surface of the housing flat surface portion opposite to a surface of the housing flat surface portion that faces the light guide flat surface, the light receiving element being mounted on the base plate,
the housing flat surface portion has a through-hole at a position corresponding to the light-scattering portion, and
the base plate comprises a light reflector that is disposed at a position corresponding to the through-hole.

4. An illumination device comprising:
a light source; and
a rod-like light guide to guide incident light toward an object to be illuminated, the rod-like light guide extending in a longitudinal direction, wherein
the light source is placed at an end of the light guide in the longitudinal direction,
the light guide comprises:
an incident surface to receive light emitted from the light source, the incident surface being located at the end in the longitudinal direction;

an emission surface to emit light incident on the light guide toward the object to be illuminated, the emission surface being flat and extending in the longitudinal direction;

a reflective surface with a paraboloid shape to reflect light from a focus of the paraboloid shape or light passing through the focus from a predetermined area toward the emission surface; and a light-scattering portion, having a predetermined scattering area, to scatter the incident light received by the incident surface and then reflect the light toward the reflective surface, and the light-scattering portion is placed at the focus of the paraboloid shape or at a position at which the light reflected by the scattering area of the light-scattering portion passes through the focus of the paraboloid shape, the light-scattering portion is provided on a light guide surface of the light guide, the light-scattering portion is located near to the reflective surface extending in the longitudinal direction, the reflective surface connecting the light guide surface and the emission surface, and the direction of the light reflected by the reflective surface toward the emission surface and a direction of a normal to the emission surface make an angle θ satisfying θ<sin$^{-1}$(1/n), where n is a refractive index of the light guide.

5. An image reading device, comprising:

the illumination device according to claim 4;

a light receiving element to convert received light to an electrical signal;

an optical imaging system to form, on the light receiving element, an image of light emitted from the illumination device and reflected by the object to be illuminated; and a housing accommodating or holding the illumination device, the light receiving element, and the optical imaging system.

6. The image reading device according to claim 5, wherein the light guide surface is a light guide flat surface that is flat, the housing has a housing flat surface portion that is located to face the light guide flat surface, the housing flat surface portion being flat, the image reading device further comprises a base plate placed on a surface of the housing flat surface portion opposite to a surface of the housing flat surface portion that faces the light guide flat surface, the light receiving element being mounted on the base plate, the housing flat surface portion has a through-hole at a position corresponding to the light-scattering portion, and the base plate comprises a light reflector that is disposed at a position corresponding to the through-hole.

7. An image reading device, comprising:

an illumination device comprising:

a light source placed at an end of a light guide in a longitudinal direction;

a rod-like light guide to guide incident light toward an object to be illuminated, the rod-like light guide extending in the longitudinal direction, the light guide comprising:

an incident surface to receive light emitted from the light source, the incident surface being located at the end in the longitudinal direction;

an emission surface to emit light incident on the light guide toward the object to be illuminated, the emission surface being flat and extending in the longitudinal direction;

a reflective surface with a paraboloid shape to reflect light from a focus of the paraboloid shape or light passing through the focus from a predetermined area toward the emission surface; and a light-scattering portion, having a predetermined scattering area, to scatter the incident light received by the incident surface and then reflect the light toward the reflective surface, the light-scattering portion being placed at the focus of the paraboloid shape or at a position at which the light reflected by the scattering area of the light-scattering portion passes through the focus of the paraboloid shape, wherein the light reflected by the reflective surface toward the emission surface travels in a direction parallel with a direction of a normal to the emission surface that is flat and that extends in the longitudinal direction;

a light receiving element to convert received light to an electrical signal;

an optical imaging system to form, on the light receiving element, an image of light emitted from the illumination device and reflected by the object to be illuminated; and a housing accommodating or holding the illumination device, the light receiving element, and the optical imaging system, wherein the light guide has a light guide flat surface that is a flat surface of the light guide, the housing has a housing flat surface portion that is located to face the light guide flat surface, the housing flat surface portion being flat, the image reading device comprises a base plate on which the light receiving element is mounted, the base plate being disposed on a surface of the housing flat surface portion opposite to a surface of the housing flat surface portion that faces the light guide flat surface, the housing flat surface portion has a through-hole that is formed at a position corresponding to the light-scattering portion, and the base plate comprises a light reflector that is disposed at a position corresponding to the through-hole.

* * * * *